April 6, 1954 W. CORDOVA 2,674,507

RECORD FILE

Filed July 13, 1951 2 Sheets-Sheet 1

William Cordova
INVENTOR.

BY Clarence A. O'Brien
and Harvey B. Jacobson
Attorneys

William Cordova
INVENTOR.

BY Clarence A. O'Brien
and Harvey B. Jacobson
Attorneys

Patented Apr. 6, 1954

2,674,507

UNITED STATES PATENT OFFICE 2,674,507

RECORD FILE

William Cordova, Sand Springs, Okla.

Application July 13, 1951, Serial No. 236,560

4 Claims. (Cl. 312—15)

This invention relates to a file for phonograph records and has for its primary object to provide a file capable of holding a number of records on edge and novel key or plunger means for selectively ejecting the records as desired.

A further object of this invention is to provide a record file which is relatively simple in design and construction, inexpensive, attractive, very easy to manipulate for the selective ejection of a desired record and which is also provided with a means for directing the records toward the rear of and wholly within the compartment when replaced therein.

A further object of this invention is to provide a phonograph record file of the character described wherein a plurality of keys or plungers are employed for selectively ejecting records, the keys having symbols or numbers thereon serving as identification for the records.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
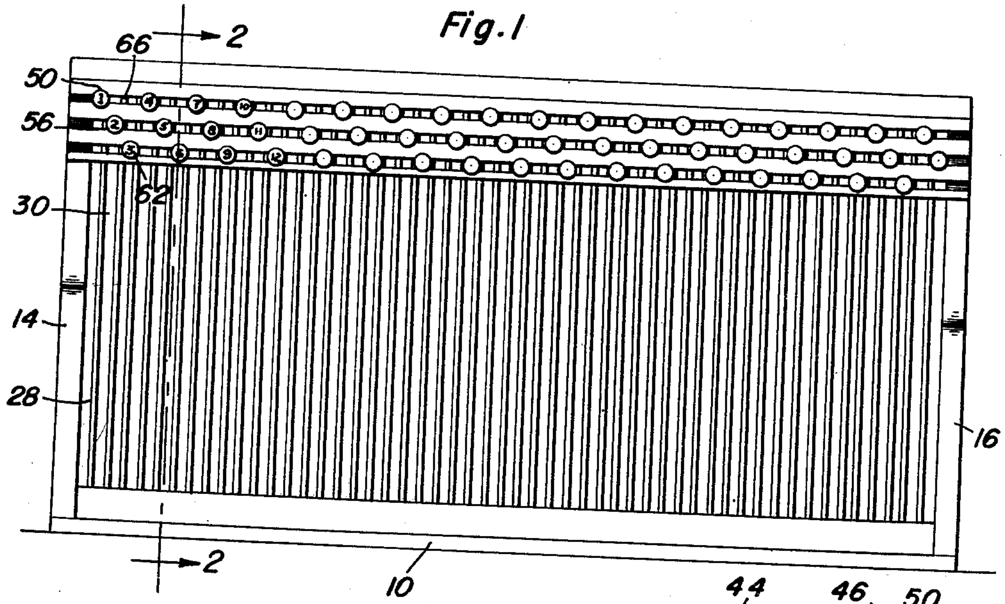
Figure 1 is a front elevational view of the file cabinet.
Figure 3:
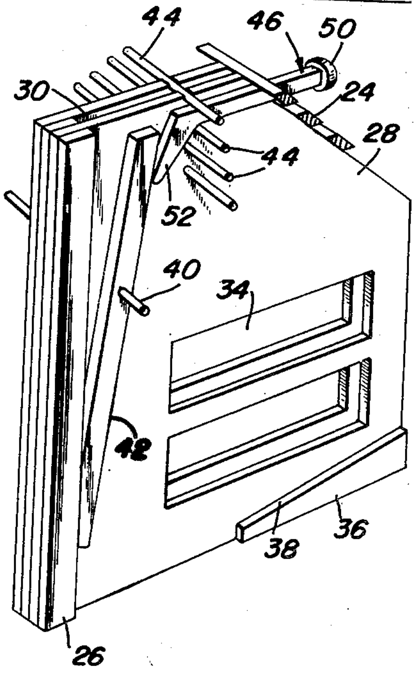
Figure 3 is an enlarged perspective view showing how the partitions are assembled.

The cabinet or housing is elongated and preferably substantially rectangular and may be fabricated of wood, metal or a suitable plastic. The housing includes a base member 10 to which is secured side members 14 and 16, a rear wall or panel 18 and a top wall 20. The side members 14, 16 have their upper portions angulated toward the rear wall 18 and joining the side wall upper edges adjacent the front edge of said top wall 20. The front of the housing is open as shown clearly in the drawings and depending from the top wall 20 in a downward and forward inclination is a ledge 22 composed of a plurality of vertically spaced longitudinally extending slats 24. The internal construction of the housing or cabinet is best shown in Figure 3 and it will be seen that a plurality of vertically extending spacer bars 26 are provided which are appropriately secured, by gluing or other means, to the rear panel and the base member. Secured by any appropriate means, as by gluing and so forth, between adjacent pairs of the spacer bars 26 is a plurality of vertically extending partitions 28 of the same general shape as the side members 14 and 16 and forming between adjacent partitions longitudinally spaced compartments 30 for receiving phonograph records 32 on edge. The partitions are provided with cut-out portions 34 to reduce the weight of the cabinet or housing and secured to the base member 10 within each compartment is a block 36 having an upper-surface 38 which is downwardly and rearwardly inclined so that when a record 32 is placed on edge in each compartment it will rest upon the block and be directed toward the rear panel 18 of the housing or cabinet and entirely within the housing as shown clearly in Figure 2.

A manually operable push-type means is provided for urging the record selectively out of the front of the cabinet or housing and this means will be described hereinafter. An elongated rod 40 is provided which extends through the partition of the side members and is disposed adjacent the rear panel 18 of the housing. Eccentrically pivoted on the rod is a plurality of lever bars 42, there being one lever bar disposed in each one of the compartments between adjacent partitions. The eccentric pivoting is such that the greater weight and proportion of the lever bar is beneath the rod 40 so that the lower portion normally abuts the vertical spacer bar 26 as shown clearly in Figure 3.

Figure 7:
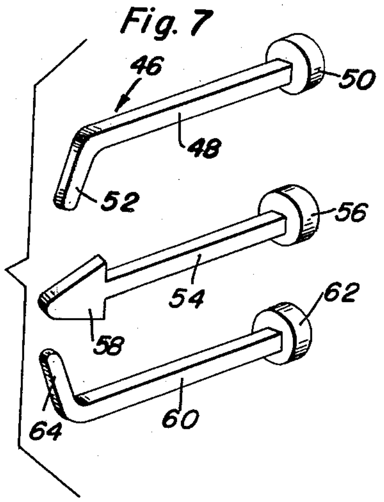
Figure 7 is a group perspective view of the keys or plungers.
Figure 5:
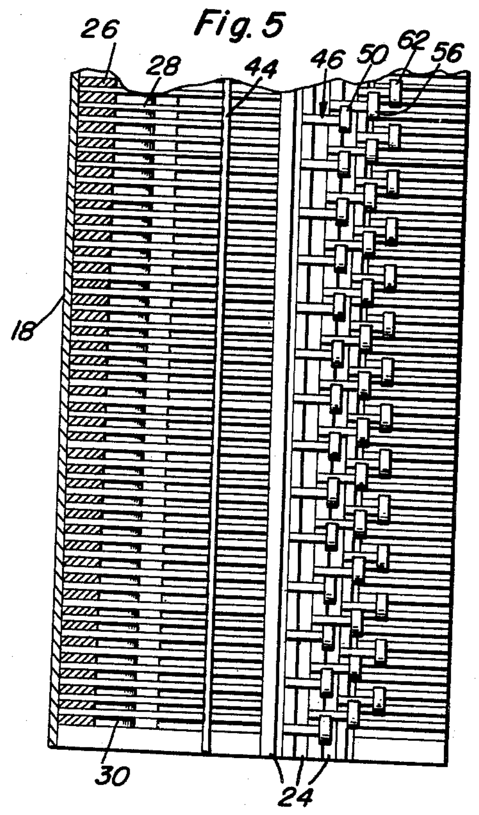
Figure 5 is a sectional view taken substantially on the line 5—5 of Figure 2.

A plurality of vertically spaced longitudinally extending rods 44 are provided which extend centrally through the partitions and the side members 14 and 16 adjacent the top member 20 and serve as guides for slidably retaining push rods or keys 46. Each of adjacent parallel rods 44 straddle the longitudinal edges of the push bars or keys and a plurality of these rods are provided so that the key can be retained in staggered relationship on the cabinet or housing, such a relationship being required because the spacing of the compartment is relatively narrow to accommodate the narrow width of conventional phonograph records. The construction of the push bars or keys is particularly shown in Figure 7, one of the push bars or keys having an elongated shank 48 having an enlarged head 50 at one end and a downwardly curved portion 52 at its other or inner end, the latter being adapted to abut the guide rods 44 to limit outward movement of the bar as will be readily understood. A second push bar or key has an elongated shank 54 having an enlarged head 56 at one end and an enlarged triangular head 58 at its other for serving as a stop means analogous to the downwardly inclined portion 52. A third push bar or lever has an elongated shank 60 with an enlarged head 62 at one end and an upwardly angulated portion 64 at its inner end serving as a stop. It will be seen that there is a push bar or key for each compartment and the shank portion thereof extends slidably through a suitable aperture 66 between each of the slats 24 of the inclined ledge 22.

Figure 2:
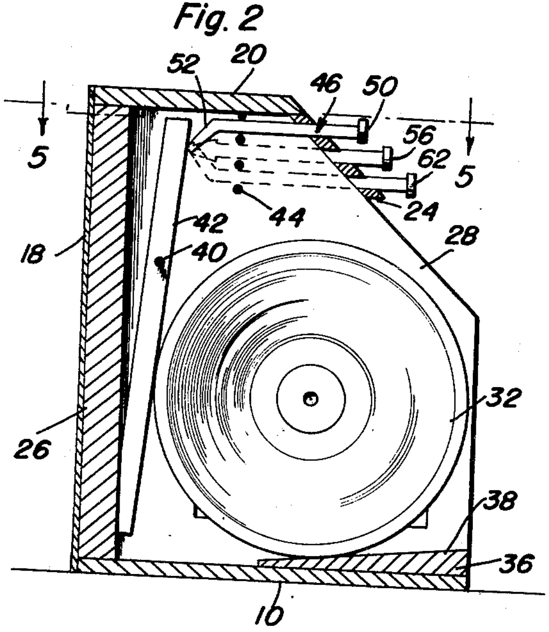
Figure 2 is a sectional view taken substantially on the plane of section line 2—2 of Figure 1.
Figure 4:
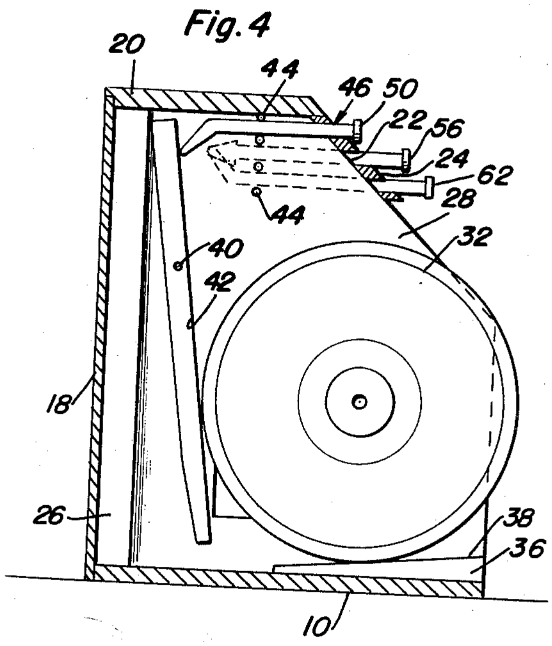
Figure 4 is a sectional view similar to Figure 2, illustrating the operation of the file in ejecting a record.
Figure 6:
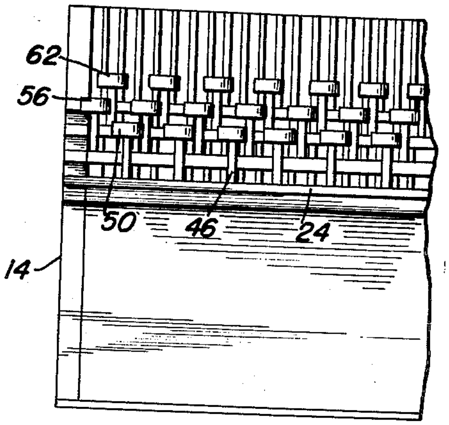
Figure 6 is a fragmentary elevational view illustrating an optional use of the file.

In use, when one of the push bars or keys is pulled outwardly of the cabinet or housing, the lower portion of the lever bar 42 in the compartment will pivot by its own weight toward the rear panel of the housing. The record 32 placed in the compartment on edge will be directed by the upper rearwardly and downwardly inclined surface 38 of the block 36 toward the rear of the housing and wholly within the latter as shown in Figure 2. A portion of the edge of the record will bear upon one longitudinal edge of the lever bar. When the push bar or key is now pushed inwardly, the inner end 52, 58 or 60 thereof will abut the portion of the lever bar above the pivot rod 40 and move the lower portion of the lever bar into the position shown in Figure 4 where it will push the record outwardly through the open front of the housing and expose a portion thereof so that the record can be easily removed. It will be understood that while the present invention is designed particularly for phonograph records, it is also adaptable for use with cards or other relatively stiff, thin material and, as shown clearly in Figure 6, can be optionally positioned for use so that the keys are vertically extending instead of horizontally extending to eject the record upwardly. The heads 50, 56 or 62 of the keys may have numbers or other indicia thereon for identification of each record in each compartment.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A phonograph record file comprising a housing including an elongated base, side walls, a rear wall and a top wall, said housing having an open front, said base being wider than said top wall, the front edges of said side walls having their upper portions angulated toward said rear wall and joining the side wall upper edges adjacent the front edge of said top wall, partitions in said housing dividing the same into record receiving compartments and being of a configuration identical to that of said side walls, blocks on said base between said partitions normally directing records on edge in said compartments toward the rear wall, and manually operable means for urging records toward and out of the front end of said housing, said manually operable means being disposed on the front of the housing adjacent the top wall thereof, elongated slats extending between and secured at their ends to the upper portions of said side wall edges, said slats being spaced from one another, said manually operable means including a rod extending through said partitions adjacent said rear wall, lever bars eccentrically pivoted for movement in vertical planes on said rod and disposed in said compartment, and plungers extending through said slats for pivoting said lever bars whereby each lever bar bears on the edge of a record and pushes it through the open front of the housing.

2. A phonograph record file comprising a housing including an elongated base, side walls, a rear wall and a top wall, said housing having an open front, said base being wider than said top wall, the front edges of said side walls having their upper portions angulated toward said rear wall and joining the side wall upper edges adjacent the front edge of said top wall, partitions in said housing dividing the same into record receiving compartments and being of a configuration identical to that of said side walls, blocks on said base between said partitions normally directing records on edge in said compartments toward the rear wall, and manually operable means for urging records toward and out of the front end of said housing, said manually operable means being disposed on the front of the housing adjacent the top wall thereof, elongated slats extending between and secured at their ends to the upper portions of said side wall edges, said slats being spaced from one another, said manually operable means including a rod extending through said partitions adjacent said rear wall, lever bars eccentrically pivoted for movement in vertical planes on said rod and disposed in said compartment, and plungers extending through said slats for pivoting said lever bars whereby each lever bar bears on the edge of a record and pushes it through the open front of the housing, said manually operable means further including a plurality of vertically spaced rods extending through the upper portions of said partitions in horizontal alignment with said slats, said plungers being guided for horizontal sliding movement between said rods.

3. The combination of claim 2 wherein said plungers are arranged in vertically staggered relation between said slots.

4. The combination of claim 2 wherein said plungers include stop means for preventing their complete withdrawal from the housing, said stop means abutting said lever bars upon depression of the plungers.

References Cited in the file of this patent

UNITED STATES PATENTS

| Number | Name | Date |
|---|---|---|
| 876,865 | Denovan | Jan. 14, 1908 |
| 1,014,929 | Wood | Jan. 16, 1912 |
| 1,117,118 | Weis | Nov. 10, 1914 |
| 1,145,712 | Stevens | July 6, 1915 |
| 1,208,346 | Marsh | Dec. 12, 1916 |
| 1,264,851 | Pemberton | Apr. 30, 1918 |
| 1,267,981 | Crippen | May 28, 1918 |
| 1,393,065 | Young | Oct. 11, 1921 |
| 1,402,614 | Hughes | Jan. 3, 1922 |
| 1,587,200 | Sutcliffe | June 1, 1926 |

FOREIGN PATENTS

| Number | Country | Date |
|---|---|---|
| 396,797 | Great Britain | Aug. 14, 1933 |